(12) United States Patent
Vild et al.

(10) Patent No.: US 7,662,335 B2
(45) Date of Patent: *Feb. 16, 2010

(54) METAL SCRAP SUBMERGENCE APPARATUS

(75) Inventors: Chris T. Vild, Cleveland Heights, OH (US); Jan H. L. Van Linden, Pittsburgh, PA (US)

(73) Assignee: Pyrotek, Inc., Spokane, WA (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/580,737

(22) PCT Filed: Nov. 26, 2004

(86) PCT No.: PCT/US2004/039737

§ 371 (c)(1),
(2), (4) Date: Sep. 7, 2006

(87) PCT Pub. No.: WO2005/054521

PCT Pub. Date: Jun. 16, 2005

(65) Prior Publication Data

US 2008/0006973 A1 Jan. 10, 2008

Related U.S. Application Data

(60) Provisional application No. 60/525,534, filed on Nov. 26, 2003.

(51) Int. Cl.
*C21B 13/00* (2006.01)

(52) U.S. Cl. .................................. 266/216; 266/901
(58) Field of Classification Search ................ 266/200, 266/216, 900, 901
See application file for complete search history.

(56) References Cited

U.S. PATENT DOCUMENTS

| 1,773,729 | A |   | 8/1930  | Hall |
| 2,386,565 | A | * | 10/1945 | Nissim ........................ 266/214 |
| 2,656,717 | A |   | 10/1953 | Fourmanoit |
| 3,776,660 | A | * | 12/1973 | Anderson et al. ........... 415/196 |
| 4,286,985 | A |   | 9/1981  | Van Linden et al. |
| 5,310,412 | A |   | 5/1994  | Gilbert et al. |
| 6,036,745 | A | * | 3/2000  | Gilbert et al. ................ 75/686 |
| 6,217,823 | B1|   | 4/2001  | Vild et al. |
| 6,451,247 | B1|   | 9/2002  | Mordue et al. |
| 2003/0075844 | A1 |   | 4/2003 | Mordue et al. |

* cited by examiner

*Primary Examiner*—Scott Kastler
(74) *Attorney, Agent, or Firm*—Fay Sharpe LLP

(57) ABSTRACT

A material scrap submergence device comprises a body (10) of heat resistant and/or a refractory material that includes a side wall (12) and a base (14) that define a submergence chamber (10). The refractory body (10) can include passages (24) that receive rods (22). The rods (22) can place the refractory body (10) under compression. In another embodiment, the body is confined by a frame (72) attached to the body. The submergence chamber (10) can also be used as a gas injection chamber.

18 Claims, 6 Drawing Sheets

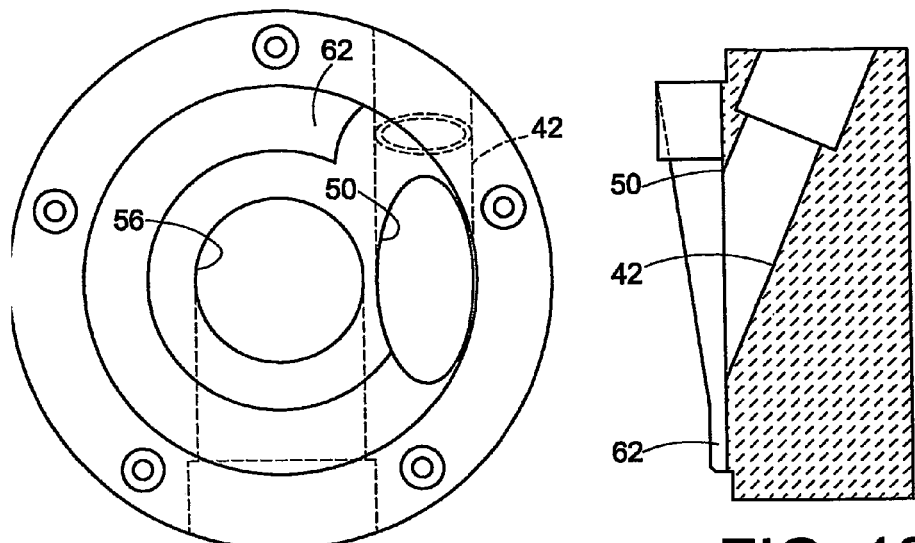
FIG. 9
FIG. 10
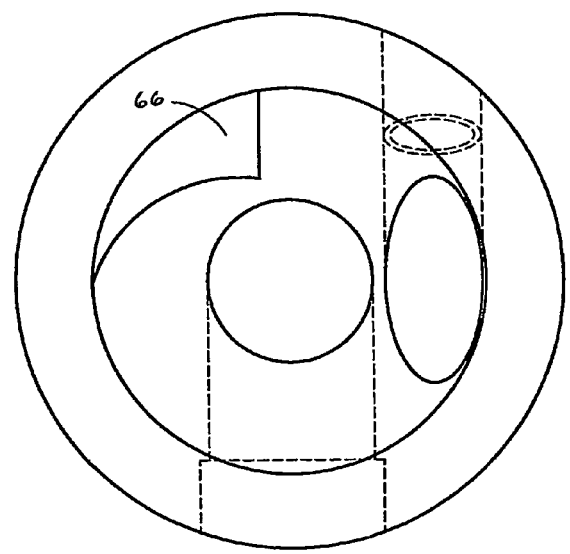
FIG. 11

METAL SCRAP SUBMERGENCE APPARATUS

This application claims the benefit of provisional application No. 60/525,534 filed Nov. 26, 2003, which is herein incorporated by reference.

BACKGROUND OF THE INVENTION

In the recycling of metals, aluminum scrap pieces are melted for treatment and processing. A large portion of the aluminum scrap pieces are thin walled as a result of the mechanical shaping action from which they were formed. Melting thin walled scrap pieces is difficult because rapid submergence in molten metal is severely hampered since thin walled scrap pieces tend to float on molten metal. Unfortunately, extended exposure to the hostile atmosphere in a traditional melting furnace results in extremely high oxidation loss.

In a typical melting operation, a melting furnace is provided with an enclosed hearth and a connected open sidewall. Usually the sidewell is divided into a pump well and a melting bay. A pump or other molten metal flow inducing apparatus is positioned in the pump well and pumps molten metal from the hearth to the melting bay. Sometimes the melting bay is further divided into a chargewell and a drosswell. Metal scrap pieces are fed into the melting bay, particularly the chargewell.

A variety of apparatus have been used in the melting bay, specifically in the chargewell, to facilitate the submergence of the scrap metal below the surface of the molten metal bath. Three major types of systems exist. The first type includes mechanical systems constructed primarily of a rotor that creates a molten metal flow from the top surface. The second type of system uses a mechanical device to physically push the scrap below the melt surface (elephant feet/well-walkers). The third type of system relies on the shape of the chamber to create a metal flow that submerges scrap pieces in the chargewell. Particularly, the flow of molten metal into the chargewell is manipulated in such a manner to achieve a vortex that draws chips from the top surface into the bath.

In known systems that rely on the shape of the chamber to create a metal vortex flow, the chargewell is typically made of a refractory material. Significant stress is imparted on the chargewell because the temperature of the molten metal inside of the chargewell is very high and the lower portion of the chargewell is typically submerged in the furnace while the upper portion of the charge well is not. This can create a large temperature gradient between the refractory material in the lower portion of the chargewell and the refractory material in the upper portion of the chargewell. In addition, the forces created by the high speed metal circulation impart stresses on the chamber walls. Since the chamber is often an integral component of the furnace, repair of the walls, or in fact even cleaning, can be a difficult and expensive undertaking, particularly in the form of furnace downtime.

SUMMARY OF THE INVENTION

A material scrap submergence device comprised of a body of heat resistant and/or a refractory material includes a side wall and a base that define a submergence chamber. In one embodiment, the body includes passages that receive rods. In another embodiment, the body is confined by a frame attached to the body. The device can also include a gas injection inlet.

BRIEF DESCRIPTION OF THE FIGURES

FIG. 9 is a plan view of an alternative embodiment of a base for a metal scrap submergence device similar to the device depicted in FIG. 1.

FIG. 10 is a cross-sectional view of the base of FIG. 9 showing an inlet passage.

FIG. 11 is a plan view of an alternative embodiment of a metal scrap submergence device similar to the device depicted in FIG. 1.

DETAILED DESCRIPTION OF THE INVENTION

Figure 1:
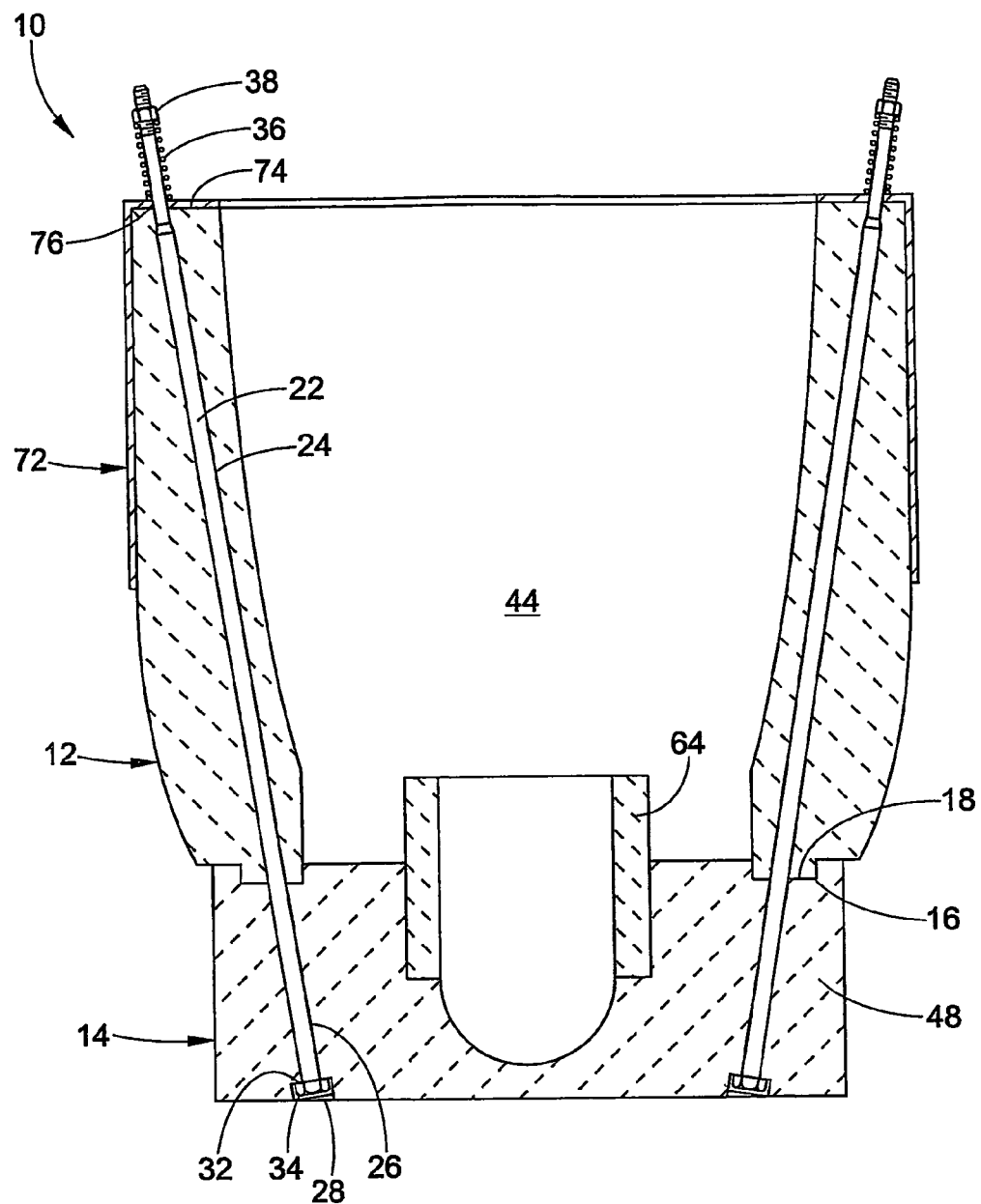
FIG. 1 is a cross-sectional view of a modular metal scrap submergence device.

With reference to FIG. 1, a modular metal scrap submergence device 10 includes a side wall 12 mounted to a separate base 14. The side wall and the base are made from a refractory material, one non-limiting example being graphite. In the embodiment depicted in FIG. 1, the base 14 includes a notch 16 that receives a cooperative protrusion 18 of the side wall 12. In an alternative embodiment, the base can include a protrusion and the side wall can include an appropriately shaped notch or channel for receiving the protrusion. In yet another alternative embodiment, a metal scrap submergence device 10 includes a body of refractory material having a side wall 12 and a base 14. In this instance, the side wall 12 and the base 14 are not removable from one another. The scrap submergence device is not limited to simply the embodiments depicted, but can include submergence devices disclosed in U.S. Pat. Nos. 6,217,823; 6,036,745 and 4,286,985, each of which is herein incorporated by reference. The submergence devices 10 can be received inside of a well that would typically be referred to as a chargewell, such as that disclosed in U.S. Pat. No. 6,217,823 in FIG. 1.

In the embodiment depicted in FIG. 1, rods 22 are provided to secure the side wall 12 to the base 14. In an alternative embodiment the side wall and the base can be a single body of refractory material, e.g. graphite. In that case, rods 22 do not secure the side wall 12 to the base wall, but rather the rods can place the unitary body in compression. The rods can be similar to the rods described in U.S. Pat. No. 6,451,247, which is herein incorporated by reference. The side wall 12 includes substantially vertical passages 24 into which the rods 22 are inserted. The base 14 also includes substantially vertical passages 26 that align with the passages 24 of the side wall and receive the rods 22. The base also includes cavities 28 that align with the passages 24 and 26. The cavities 28 allow a nut or another retaining element 32 to be attached to the rod 22. A plug 34 that can be made from refractory material can be inserted into the cavity 28 to protect the rod 22 and retaining element 32. Other forms of attachment can be used to attach the rod 22 to the base 14, including those described in copending patent application Ser. No. 10/244,883, filed Sep. 16, 2002 and herein incorporated by reference.

A biasing member 36 can be provided at the top of each rod 22. The biasing member 36 can comprise a plurality of Bellville-type disk springs that include an opening through which the rod 22 is received. A nut 38 attaches above the springs 36 and when the nut is tightened, the biasing member 36 applies a compressive force on the sidewall 12 and the base 14. Other conventional biasing members can be used instead of the Bellville-type disk springs. Though not to be bound by theory, it is believed that placing the side wall 12 (FIG. 1) and/or the unitary body in compression extends the life of the submergence device 10. By placing the body and/or the side wall 12 in compression, the effect of thermal stresses on the refractory material can be reduced. To limit the effect of the thermal stresses on the refractory material the compressive force need not be that great when the rod and the refractory body are originally assembled.

Figure 3:
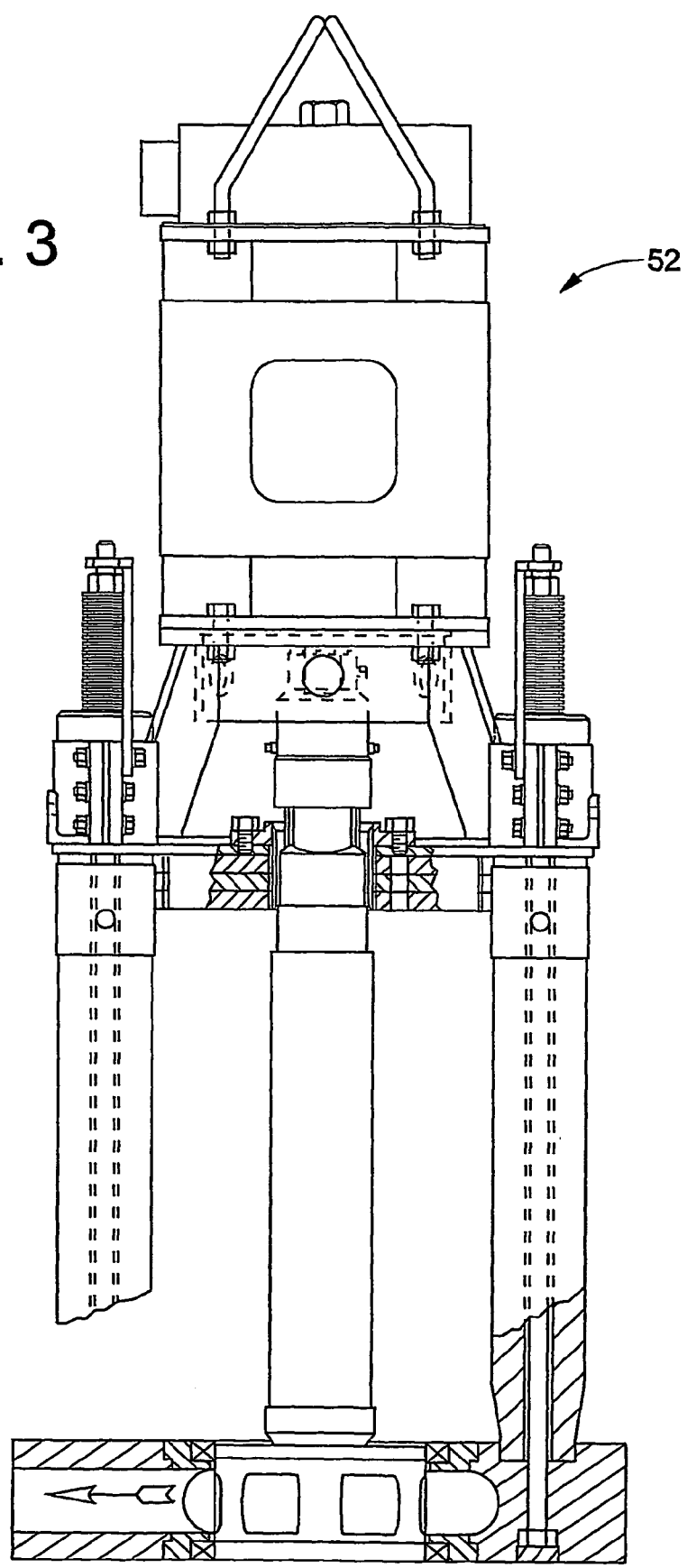
FIG. 3 is front elevation view, partially in cross-section, of a molten metal pump.
Figure 4:
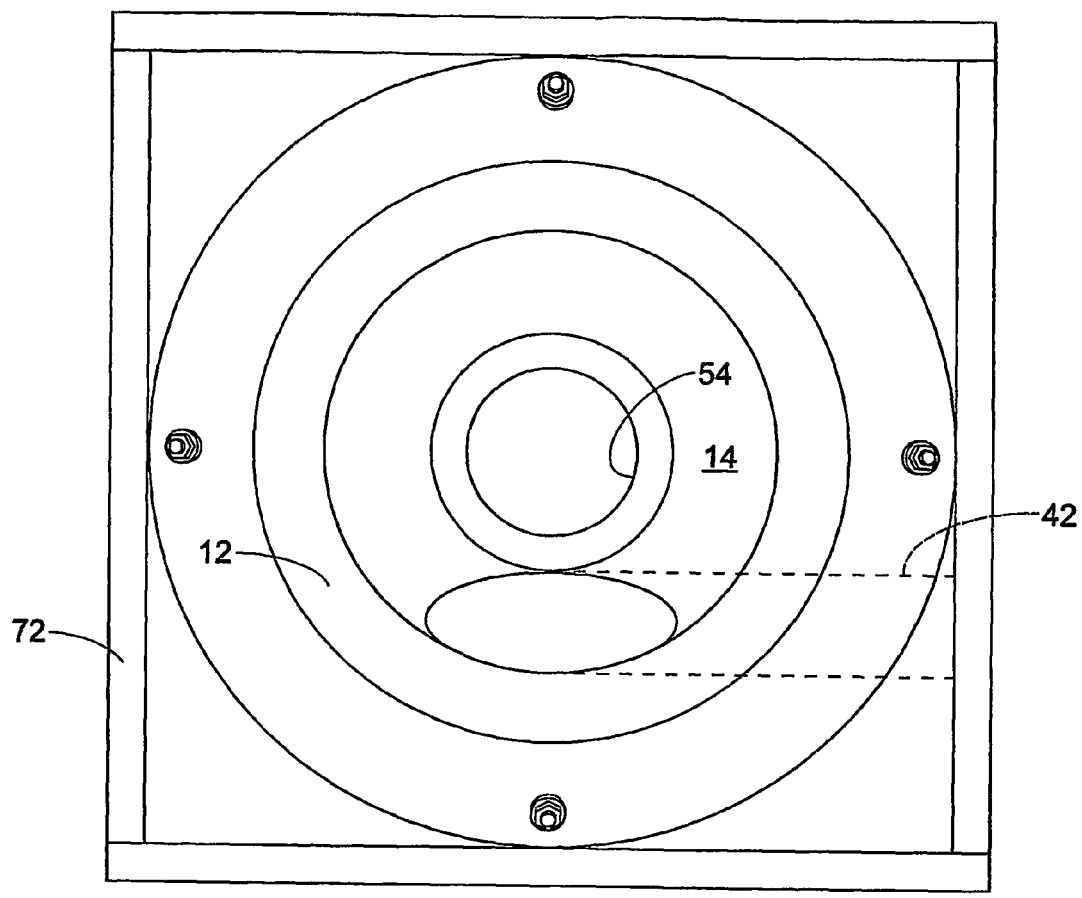
FIG. 4 is a plan view of the metal scrap submergence device of FIG. 1.
Figure 7:
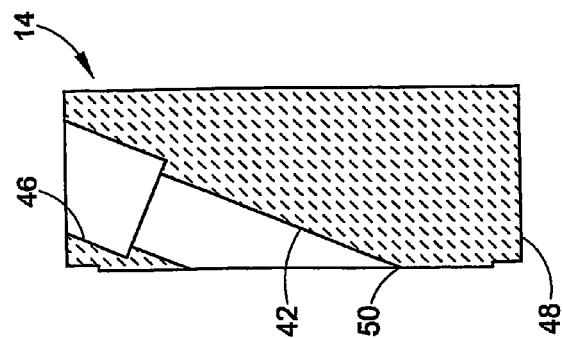
FIG. 7 is a cross-sectional view of the base of FIG. 5 showing an inlet passage.
Figure 5:
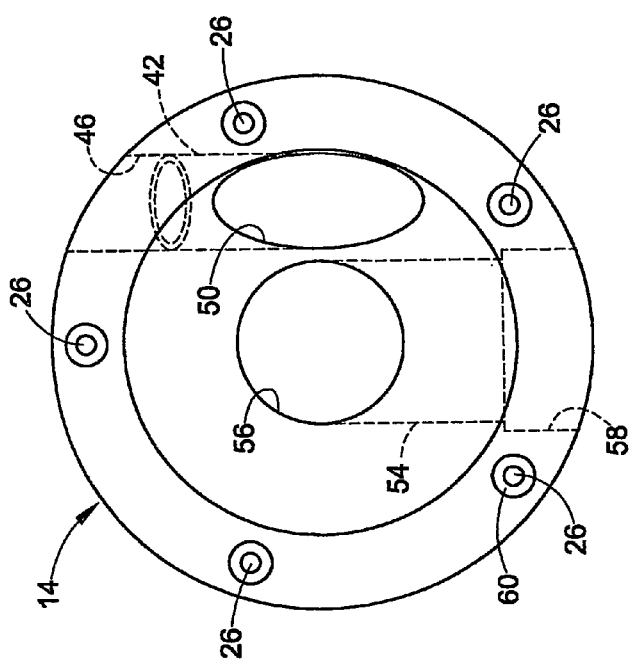
FIG. 5 is a plan view of an alternative embodiment of a base for a metal scrap submergence device similar to the device depicted in FIG. 1.
Figure 8:
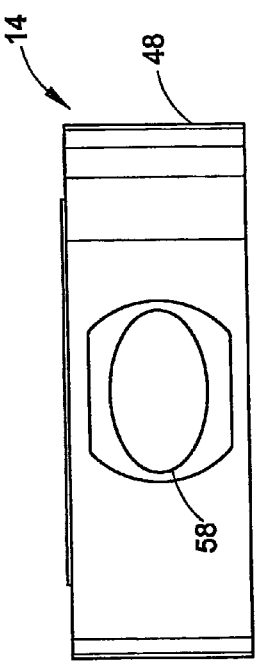
FIG. 8 is a side elevation view of the base of FIG. 5 showing a discharge passage outlet opening.

With reference to FIG. 5, a top view of the base 14 having five passages 26 that can receive the rods 22 (FIG. 1) is shown. The base 14 includes an inlet passage 42 (shown in phantom in FIG. 5) that allows molten metal to enter a submergence chamber 44 (FIG. 1), defined by the side wall 12 and the base. The inlet passage 42 begins at a passage inlet opening 46 defined in a side wall 48 of the base 14. The side wall 48 of the base 14 in combination with the side wall 12 forms the overall side of the apparatus 10. The inlet passage 42 terminates at a chamber inlet opening 50 that is defined in a top surface of the base 14. The passage inlet opening 46 is adapted to receive a transfer pipe (not shown) that is in communication with a discharge outlet of a molten metal pump, such as the molten metal pump 52 depicted in FIG. 3, which is known in the art. The chamber inlet opening 50 is substantially elliptical due to the linear upward slope of the inlet passage 42 through the base 14. The inlet passage 42 is substantially tangential to an inner surface of the at least substantially circular side wall 12. Such a configuration promotes the creation of a vortex flow of molten metal inside the submergence chamber 44.

Figure 6:
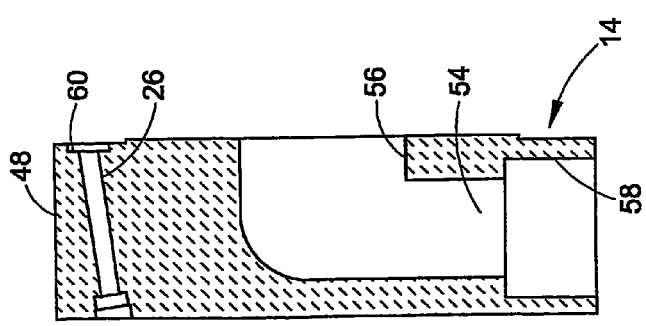
FIG. 6 is a cross-sectional view of the base of FIG. 5 showing a discharge passage.

The base 14 also includes a discharge passage 54 (shown in phantom in FIG. 5). The discharge passage 54 communicates with a chamber outlet opening 56 in the top surface of the base 14 and a discharge passage outlet opening 58 in the side wall 48 of the base 14. As shown in FIG. 6, the discharge passage 54 includes a 90 degree bend. In the embodiment depicted in FIGS. 5-8, the chamber outlet opening 56 is at the same horizontal level as the chamber inlet opening 50. Circular depressions 60 can be provided around and concentric with rod passages 26.

Molten metal enters the chamber 44 through the inlet passage 42 tangentially to the side wall 12. In the embodiments depicted in FIGS. 1-8, the upward flow of the molten metal, due to the inclined inlet passage 42, and the entrance of the molten metal tangentially to the circular side wall 14 results in a vortex being formed in the submergence chamber 44.

In another embodiment depicted in FIGS. 9 and 10, a spiral-shaped ramp 62 similar to that described in U.S. Pat. No. 6,217,823, which is herein incorporated by reference, is provided. The molten metal travels through the inlet passage 42 and through the chamber inlet opening 50 up the spiral-shaped ramp 62 and spills over an inner edge of the ramp towards the chamber outlet opening 56.

In another embodiment, depicted in FIG. 1, the molten metal flows upwardly through the inlet passage 42, similar to the embodiment described above; however, in this embodiment a riser 64 projects upwardly from the base 14 and communicates with the discharge passage 54. In this embodiment, the molten metal enters the chamber 44 at a tangent to the side wall 12 resulting in a vortex flow pattern. The molten metal continues to flow upwardly in a vortex pattern before spilling over into the riser 64 and leaving through the discharge passage 52.

In another embodiment, a flow diverter or blade 66 (FIG. 11) can be provided adjacent and/or attached to the side wall 12 of the apparatus 10, similar to that described in U.S. Pat. No. 6,036,745. In this embodiment, the vortex flow of the molten metal in the chamber 44 is controlled by the flow diverter to direct the molten metal towards the discharge passage 52. In another embodiment, the vortex flow of the molten metal can be broken by another flow of molten metal, such at that described in U.S. Pat. No. 4,286,985.

The apparatus 10 can be easily removed from a scrap-submergence system and cleaned or repaired. To facilitate placement of the apparatus in the scrap submergence system and removal of the apparatus from the scrap submergence system, a pair of fork lift pockets 68 (FIG. 2) can be provided. A steel frame 72 can be provided that surrounds the upper portion of the side wall 12 and the pockets 68 can attach to the frame. The frame 72 can have a general box-shaped configuration where the width of the box is equal to an outer diameter of the upper portion of the side wall 12. The frame could also be another configuration, such as cylindrical. The frame can attach to the upper portion of the side wall 12 in a conventional manner and can also retain the upper portion of the side wall, which can control the effect of thermal stresses on the side wall. Also, the frame can include a flange 74 having openings 76 aligned with the passages 24. The spring 36 and nut 38 can sandwich the flange 74 between the spring and the top of the side wall 12 when the rod is received through the openings.

Figure 2:
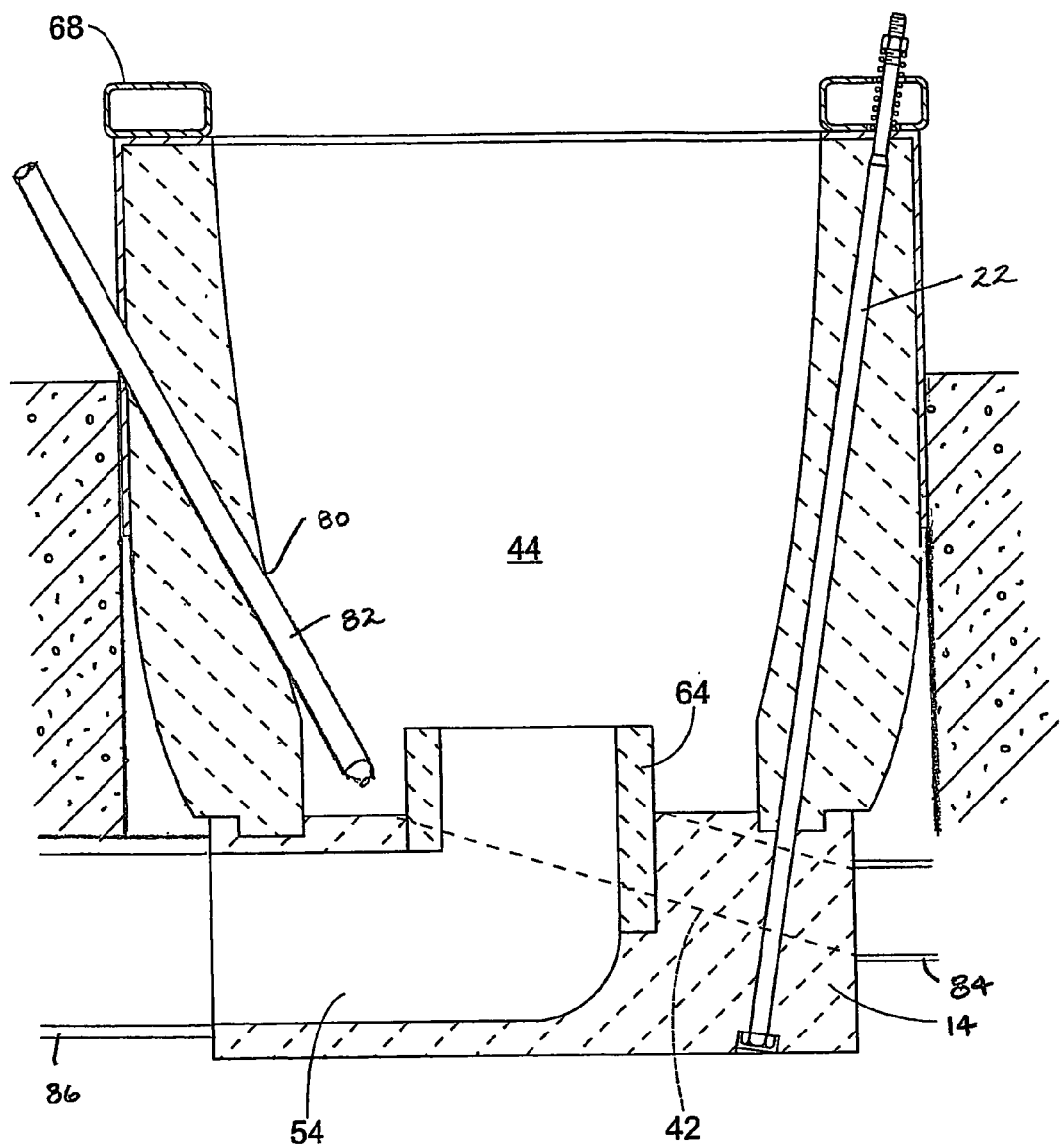
FIG. 2 is another cross-sectional view of the metal scrap submergence device of FIG. 1.

The material submergence device 10 can also be used as a gas injection chamber for a "demagging" or "degassing" operation. As seen in FIG. 2, a gas injection inlet 80 can be provided in the side wall 12. Nevertheless, the gas injection inlet 80 can be located anywhere in the device, for example in the inlet passage 42, before the inlet passage, near or in the discharge passage 54, etc. The gas injection inlet 80 can receive a gas injection tube 82 that is in communication with a gas source (typically chlorine in a "demagging" operation). In a typical "demagging" operation an insoluble material, dross, is produced that is typically skimmed from the bath. Since the material submergence device 10 is removable from the furnace, any insoluble material that collects inside the submergence chamber 44 can be removed without having to shut down the furnace for an extended period of time. One submergence device 10 can be removed from the furnace for cleaning and another clean submergence device can be placed into the furnace while the first is getting cleaned. Even though a "demagging" operation has been described, the submergence device can be used with other gas injection operations.

Also, since the submergence device 10 is removable from the furnace, an inlet extension tube 84 that communicates with the inlet passage 42 and an outlet extension tube 86 that communicates with the discharge passage 54 can also be provided. As seen in FIG. 2, the extension tubes 84 and 86 extend away from the base 14 and can either be integral with or connected to (using conventional fastening methods known in the art) the base 14. The outlet extension tube 86 makes sure or at least encourages the molten metal (and any dross) to flow underneath an arch that separates the well that receives the submergence device 10 and an adjacent dross well.

The above-described scrap submergence device increases plant operation flexibility. One advantage of a removable submergence device is scrap feed flexibility. For example, fine or low density particles may be suitable for a material submergence device that creates a vortex metal flow, but denser articles typically do not need the metal vortex flow to submerge into the molten metal bath. In a situation where denser articles are being submerged, the scrap submergence device can be removed from the furnace. Removal of the scrap submergence device can also increase the recirculation pump efficiency, since the pump no longer needs to generate the vortex flow in the material submergence device. Also, since the scrap submergence device is removable it can be easily cleaned. This allows the scrap submergence device to be used a gas injection chamber, and any dross or other solid that may accumulate on the sides of the device can be removed while another device is placed in the furnace, thus limiting the downtime of the furnace.

The apparatus has been described with reference to preferred embodiments. Modifications will occur to those who read the preceding description, along with the references incorporated by reference. It is intended that this disclosure cover all modifications disclosed by the preceding description, the incorporated references and the equivalents thereof.

What is claimed is:

1. A scrap submergence device comprising:
   a body defining a submergence chamber comprised of a refractory material, wherein said body comprises a side wall and a base, the side wall including an at least substantially vertically oriented passage, and the base including an at least substantially vertically oriented passage aligned with the passage in the side wall, at least one linearly upward sloped inlet channel and one discharge channel;
   a frame member surrounding a portion of said sidewall remote from said base, the frame further including a flange positioned adjacent a top edge of said submergence chamber, said flange including an opening aligned with said vertically oriented passage;
   a rod in the at least one passage, wherein the rod extends through the flange opening the at least one side wall passage and the at least one base passage,
   wherein said rod is placed under tension to impart a compressive load on the body and secure said frame to the body.

2. The device of claim 1, further comprising a biasing member disposed at one end of the rod for applying a compressive force on the body.

3. The device of claim 2, further comprising a retaining element at an end of the rod opposite the biasing member.

4. The device of claim 1, wherein the inlet channel is at least substantially tangential to an inner surface of the submergence chamber.

5. The device of claim 4, wherein the body defines an outlet opening at substantially a same height within the submergence chamber as an inlet opening.

6. The device of claim 1 wherein the side wall and the base are interconnected via the rod.

7. The device of claim 1, further comprises a plurality of rods within passages in said body.

8. A metal scrap submergence device comprising:
   a body comprising a side wall and a base, the side wall including an at least substantially vertically oriented passage, and the base including an at least substantially vertically oriented passage aligned with the passage in the side wall;
   a frame surrounding at least an upper portion of said body, the frame including a flange having at least one hole aligned with said passage in the side wall;
   a rod received in both of the passages and the hole in the flange securing said side wall to said base;
   an inlet passage disposed in the base for allowing molten material to enter the scrap submergence device; and
   an outlet passage disposed in the base for allowing molten material to exit the scrap submergence device,
   wherein said inlet passage is substantially tangential to said side wall creating a vortex flow of molten metal.

9. The device of claim 8, wherein the side wall is removably mounted to the base.

10. The device of claim 9, wherein the one of the side wall and the base includes a notch and the other includes a cooperating protrusion received in the notch when the side wall and the base are joined.

11. The device of claim 8, further comprising means for controlling vortex flow of molten metal inside the submergence device.

12. The device of claim 8, further comprising an outlet extension tube connected to the body and in communication with the outlet passage.

13. The device of claim 8, further comprising a riser tube extending upwardly from the base and in communication with the outlet passage.

14. The device of claim 8, wherein the body defines a gas injection inlet in communication with the submergence device and an associated gas source.

15. A furnace comprising:
   a submergence device well;
   a pump well in communication with the submergence device well;
   a dross well in communication with the submergence device well;
   a removable submergence device of claim 1 disposed in the submergence device well.

16. The device of claim 1 wherein the frame further includes pockets.

17. The device of claim 1 wherein a spring and nut secure the flange to said submergence chamber.

18. The device of claim 8 wherein a spring and nut secure the flange to said submergence chamber.

* * * * *